(No Model.) 2 Sheets—Sheet 2.
J. FRASER.
FERTILIZER DISTRIBUTER.
No. 485,269. Patented Nov. 1, 1892.
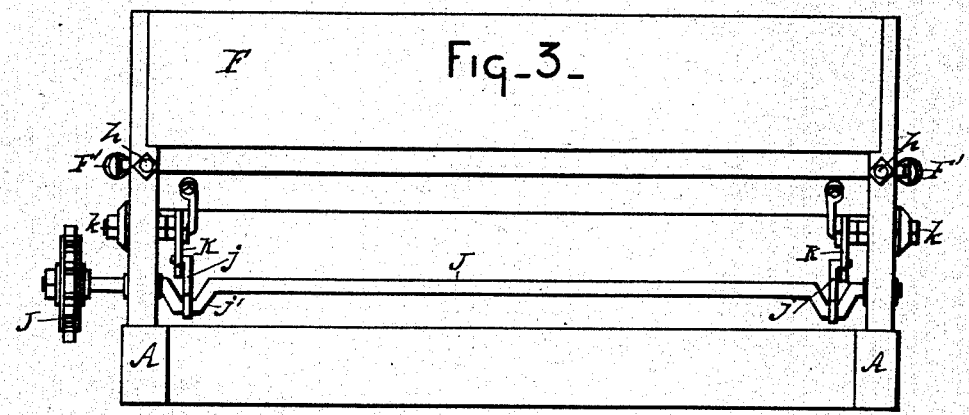
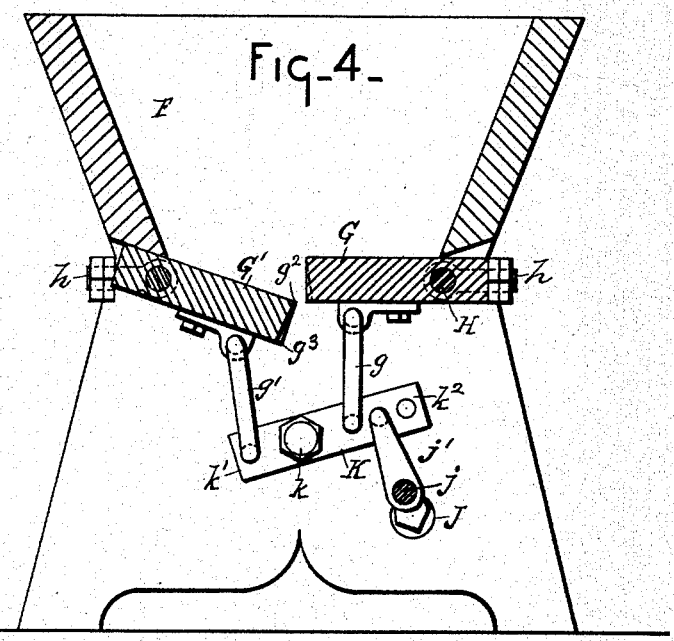
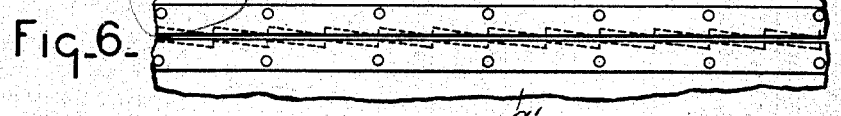
WITNESSES
C. J. Shipley
F. Clough
INVENTOR
John Fraser
By Wells W. Leggett & Co.
Attorneys.

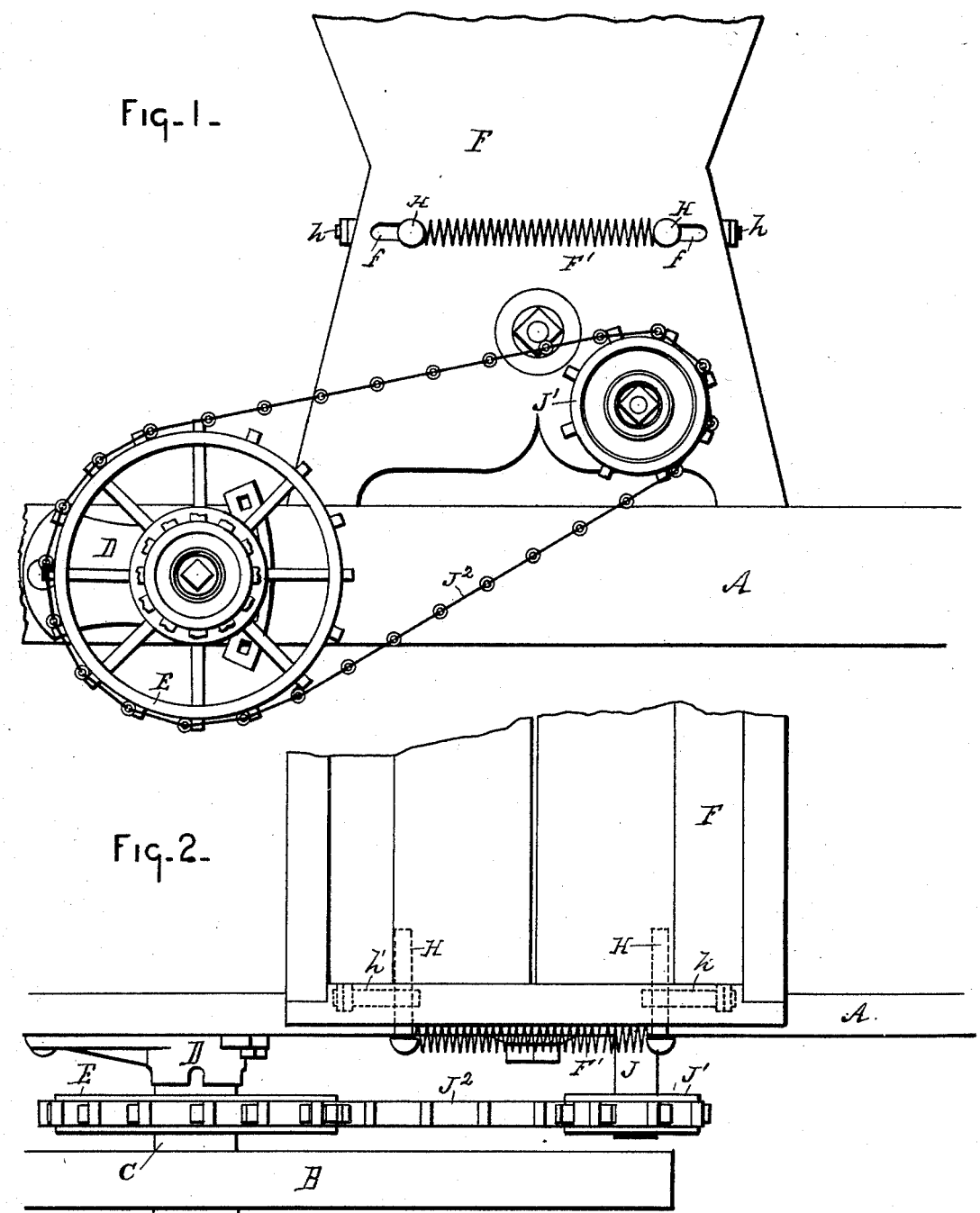

UNITED STATES PATENT OFFICE.

JOHN FRASER, OF REUTON, CANADA, ASSIGNOR TO THE AMERICAN HARROW COMPANY, OF DETROIT, MICHIGAN.

FERTILIZER-DISTRIBUTER.

SPECIFICATION forming part of Letters Patent No. 485,269, dated November 1, 1892.

Application filed September 8, 1890. Renewed September 29, 1892. Serial No. 447,339. (No model.)

*To all whom it may concern:*

Be it known that I, JOHN FRASER, a subject of the Queen of Great Britain, residing at Reuton, county of Norfolk, Province of Ontario, Canada, have invented a certain new and useful Improvement in Fertilizer-Distributers; and I declare the following to be a full, clear, and exact description of the invention, such as will enable others skilled in the art to which it pertains to make and use the same, reference being had to the accompanying drawings, which form a part of this specification.

It is the object of my invention to produce a fertilizer-distributer which may be attached to a harrow, seed-drill, or other wheeled vehicle or implement and which shall act to distribute and separate the fertilizer over the path traversed by the implement.

The invention consists in a combination of devices and appliances hereinafter described and claimed.

In the drawings, Figure 1 is a side elevation of a portion of the apparatus, showing the manner of attaching it to the frame. Fig. 2 is a plan view with parts broken away. Fig. 3 is a front elevation. Fig. 4 is a vertical section. Figs. 5 and 6 are detail views of the edges of the hopper-bottom, illustrating the construction.

In carrying out the invention I would have it understood that my distributer may be placed upon any wheeled implement, such as a wheel-harrow, seed-drill, and the like.

A represents the frame of the harrow, B one of the main wheels supporting the framework, and C the axle thereon. This axle C is supported in the bar D, which is attached to the frame, and the wheel B, being keyed to the axle, will cause the latter to revolve, carrying the sprocket-wheel E with it.

F is what may be termed a "hopper," supported on the frame and extending across the machine. The bottom of this hopper is composed of two boards or sections G G', as shown in Fig. 4. These bottom boards or sections are pivoted below the hopper at each end by the pintles H (shown by dotted lines in Fig. 2) in such manner that said boards serve to support the bulk of fertilizing material in the hopper and can oscillate on the pintles in a vertical plane.

J is a crank-shaft extending across underneath the hopper, provided on its end with a sprocket-wheel J', the sprocket-wheel J' and sprocket-wheel E being connected together by the sprocket-chain $J^2$.

K is a lever pivoted to the side of the hopper at $k$ to oscillate in a vertical plane. The end $k'$ of the lever is connected with the bottom board or section G' by the pitman $g'$, while the end $k^2$ of the lever is connected with the bottom board or section G by the pitman $g$; also, connecting the end $k^2$ of the lever with the crank portion $j$ of the crank-shaft is the pitman $j'$. It will now be seen that when the main wheel, and consequently the sprocket-wheel E, moves it revolves the crank-shaft, and through the several pitmen gives an oscillating motion in a vertical plane to the pivoted bottom boards G G', the two acting alternately. In order that the space between the edges of the bottom boards G G' may be varied, I pass the pintles H through slots $f$ in the sides of the hopper and connect the two pintles by a coil-spring F'. Embracing the pintles H are the set-screws $h$. (Shown by the dotted lines in Fig. 2 and also in Fig. 4.) Thus by means of the set-screws the two bottom boards may be adjusted toward or from each other, thus leaving more or less of a space between them, through which the fertilizer may pass.

Another feature of my invention is the corrugating or serrating of the adjoining edges of the two bottom pieces. These serrations are very slight at the upper corner of the edge, as at $g^2$, Fig. 4; but are deeper at the lower corner of the edge, as at $g^3$, Fig. 4, whereby the serrations increase in depth from their upper to their lower ends. So, also, the serrations are placed at an oblique angle, as shown in Fig. 5, so that as the two edges alternately pass each other the fertilizer in the hopper will be ground and pulverized, so that when it leaves the machine it has been reduced to the proper size.

It is of course obvious that this apparatus might be mounted on a framework of its own and not be used as an attachment to some other implement, and I would of course include by my invention a construction in which my distributer was used independently or on which it was used in connection with some other implement. So, also, if desirable or necessary, the sprocket wheel and chain might be dispensed with and the crank-shaft revolved by hand in any suitable way.

What I claim is—

1. In a fertilizer-distributer, the combination, with a hopper, of the vertically-oscillating bottom boards pivoted below the hopper and constituting the bottom thereof and means for oscillating the bottom boards in a vertical plane, substantially as described.

2. In a fertilizer-distributer, the combination, with a hopper, of the vertically-oscillating bottom boards pivoted at each end below the hopper and constituting the bottom wall thereof and means for imparting an alternating oscillating motion to the bottom boards in a vertical plane, substantially as described.

3. In a fertilizer-distributer, the combination, with a hopper, of pivoted oscillating boards constituting the bottom of the hopper and having adjacent serrated edges which rise and fall past each other in a vertical plane and mechanism for oscillating the bottom boards, substantially as described.

4. In a fertilizer-distributer, the combination, with a hopper, of pivoted oscillating boards constituting the bottom of the hopper and having their adjacent edges rising and falling past each other and provided with serrations that increase in depth from their upper to their lower ends and means for oscillating the bottom boards, substantially as described.

5. In a fertilizer-distributer, the combination, with a hopper, of oscillating boards constituting the hopper-bottom and pivoted at each end, a vertically-oscillating lever pivoted intermediate its ends below the boards, pitmen connecting the opposite ends of the lever with the boards, and a rotary crank-shaft connected with the oscillating lever, substantially as described.

6. In a fertilizer-distributer, the combination, with a hopper provided with the bottom pieces G G', of the pintles H for pivoting the bottom pieces to the hopper, said pintles resting in slots F and connected by the coil-spring F', and the set-screws $h$ for varying the distance between the pintles, and consequently between the adjoining edges of the bottom pieces, substantially as described.

7. In a fertilizer-distributer, the combination, with a hopper, of pivoted boards oscillating in a vertical plane and constituting the hopper-bottom, a vertically-oscillating lever pivoted intermediate its ends, pitmen connecting the opposite extremities of the lever with the pivoted boards, a crank-shaft connected with the lever and having a sprocket-wheel at one end and a sprocket-wheel on the axle of the machine, and a chain connecting the two sprocket-wheels, substantially as described.

8. In a fertilizer-distributer, the combination, with a hopper, of vertically-oscillating boards pivoted below the hopper and constituting the bottom thereof, a vertically-oscillating lever pivoted below the bottom boards, pitmen connecting the lever with the bottom boards, and a rotary crank-shaft journaled below and connected with the lever, substantially as described.

In testimony whereof I sign this specification in the presence of two witnesses.

JOHN FRASER.

Witnesses:
MARION A. REEVE,
W. H. CHAMBERLIN.